June 18, 1957  A. E. R. ARNOT  2,796,575
ELECTRIC MOTOR CONTROLLERS
Filed May 4, 1954
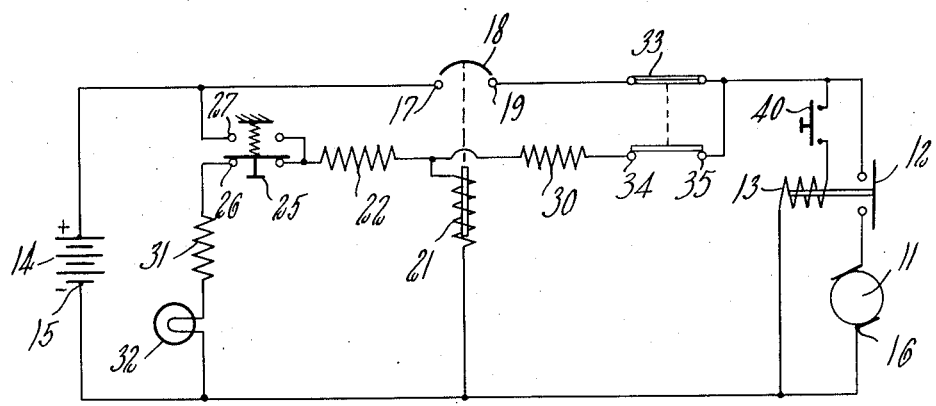

United States Patent Office 2,796,575
Patented June 18, 1957

2,796,575

ELECTRIC MOTOR CONTROLLERS

Alfred Erwin Reginald Arnot, Basingstoke, England, assignor to Emmanuel Kaye and John Reginald Sharp, Basingstoke, England Application May 4, 1954, Serial No. 427,614

Claims priority, application Great Britain May 5, 1953

3 Claims. (Cl. 318—474)

This invention comprises improvements in or relating to electric motor controllers.

The invention particularly relates to electric motor control circuits for battery-operated motors of the kind in which the motor circuit is closed by a contactor switch operated by a solenoid or the like, the solenoid being connected across the supply lines of the motor. Such circuits are employed very frequently on battery-operated vehicles for controlling the traction motors thereof, and there is usually some sort of starting button controlled by the operator, for closing the circuit of the contactor winding in order to start the motor. In the event of the battery being run down, it may be unable to move the vehicle, and thus the battery voltage, when the motor is switched on, will fall to a very low value, permitting the contactor to drop out. As soon as the contactor drops out the battery recovers its voltage. The contactor winding, which takes very little current, will close the contactor again. This will make the battery voltage fall again and the cycle is constantly repeated, with damage to the battery and objectionable wear on the contactor.

There are various systems by which this cycling of the contactor can be avoided, but the present invention relates to a novel system which has certain practical advantages.

The present invention provides a protective device for use in a battery-operated motor control circuit of the type described wherein a circuit breaker is provided having holding means, and manually-operated means connected to the said circuit breaker and holding means for closing the circuit breaker, the circuit being such that after opening the circuit breaker, remaking of the circuit cannot again be effected until the manually-operated means is again operated.

According to a feature of the invention an electric motor control circuit for a battery-operated motor comprises in combination a main contactor mechanically or magnetically operated having contacts in series with the motor, a magnetically-operated circuit breaker having contacts in series with the main contactor contacts and motor, and means for energizing the circuit breaker magnet comprising a manually-operated switch for temporarily closing a connection from the battery side of its contacts to its magnet winding, and a holding circuit or additional holding winding for said magnet energized from the motor side of its contacts. The drop-out value of the circuit breaker is set to the minimum permissible voltage of the battery on load.

It will be observed that in such a circuit, as soon as the circuit breaker interrupts the motor circuit, which it will do if the battery voltage falls off too much, it also not only interrupts the current of the motor, but also interrupts the circuit of its own hold-on winding which cannot be re-made without closing the manually-operated switch, so that cycling of the breaker by repetitively tripping and reclosing cannot occur. A mechanically-operated circuit breaker, preferably of the "trip-free" type, with low voltage release may also be used for this purpose.

Preferably the holding circuit of the starting-switch is also connected to a signal-lamp, to indicate when the circuit breaker is held closed thereby. Preferably also a bimetal strip carrying the main motor current is caused to open a contact in the circuit breaker magnet circuit in the event of an overload.

The single figure of the drawing shows a preferred circuit arrangement for carrying out the invention.

The following is a description by way of example of one particular circuit in accordance with the invention, as applied to a battery-operated truck with reference to the accompanying circuit diagram:

The truck has a traction motor 11 which is in series with a magnetically-operated main contactor 12. The contactor winding 13 is controlled by a manually operated switch 40. A traction battery 14 is provided on the truck and the negative side 15 of the battery is connected directly to the negative side 16 of the motor and to the contactor winding.

The positive side of the battery is connected to one contact 17 of a magnetically-operated circuit breaker 18. The contact 19 of the circuit breaker is connected to the contactor 12. The circuit breaker contacts 18 are closed by a solenoid winding 21 which is connected through a resistance 22 to a starting push button 25. The push button is a two-way button having one contact 26 normally closed and the other contact 27 normally open and connected to the positive terminal of the battery 14. The effect is that if the push button 25 is pressed the circuit of the normally closed contact 26 of the push button will be broken and the circuit of the normally open contact 27 will be completed from the battery 14 through the contact 27 and the resistance 22 to the solenoid winding 21 to the negative side of the battery. This will pass sufficient current through the solenoid winding 21 to close the circuit breaker contacts 17 and 19.

In the circuit between the contact 19 of the circuit breaker and the starting switch 40 there is a bimetal strip 33 having normally closed contacts 34, 35 which open when overloading takes place. A branch circuit from contact 35 passes through a resistance 30 to the solenoid winding 21 of the circuit breaker 18. The resistance 30 passes sufficient current to enable the solenoid winding 21 to hold the breaker contacts 17, 19 closed at line voltages above a predetermined value when the push button 25 is released, but allows the solenoid to drop out when the line voltage falls to a predetermined discharged battery value.

The release of the push button 25 closes its first contact 26 and connects the resistances 30, 22 through a third resistance 31 to a red signal lamp 32, which lights up as long as the circuit breaker 18 is closed and the push button 25 is released. It will be observed that the circuit of the signal lamp 32 is through the resistances 30, 22 and the third resistance 31 in series. When the circuit breaker 18 opens, the signal lamp 32 goes out. In a particular case, with a 20 voltage battery, the low resistance 22 may be say 12 ohms, the higher resistance 30 may be 88 ohms and the third resistance 31, in series with the signal lamp, may be 500 ohms. The signal lamp current is therefore very small.

In operation, with the various circuit elements in their normal positions as shown in the drawing, to start motor 11, push button switch element 25 is closed against its normally open contact 27. Current then flows from battery 14 through the resistance 22 and the solenoid winding 21, which winding is thus energized to close the normally open contacts 17 and 18 of circuit breaker 18. Switch 40 is then manually closed, and, since the contacts 34, 35 are normally closed, winding 13 is energized and main contactor 12 closed to start motor 11. The release of push button switch 25 to its normally closed contact 26 will not deenergize solenoid winding 21, since sufficient current to hold circuit breaker 18 closed flows through resistance 30 and solenoid winding 21. Said release will also pass current to signal lamp 32. The bimetal strip 33 acts as an overload device during normal operation, since a heavy overload current passing through it will open its contacts 34, 35, which de-energizes both winding 13 and winding 21, and requires operation of push button switch 25 to restart the motor 11.

In the case of an attempted start when the battery is run down, the following sequence occurs: push button switch 25 energizes winding 21 and closes circuit breaker 18 as before, and then is released to its contact 26. As the battery voltage falls off due to its run down condition, insufficient current will be passed through resistance 30 and solenoid winding 21 to hold circuit breaker 18 closed—consequently it opens. Although the voltage in the battery then builds up rapidly due to its being off load, the circuit breaker will not again close until push button switch 25 be operated.

The advantage of the circuit of the present invention is that the circuit breaker prevents over-discharge of the battery as well as burning of starting switch contacts due to "flapping" which is common on battery driven circuits using magnetically-operated starting switches.

I claim:
1. In an electric motor circuit including an electric motor and an operating battery, a control circuit comprising a main circuit breaker having contacts controlling the energization of said motor by said battery and an actuating winding associated with said contacts to control the condition of said contacts, a closing circuit for said main breaker contacts comprising a first pair of switch contacts and a first resistance in series with said winding across said source, and a holding circuit comprising said main breaker contacts and a second resistance in series with said winding across said source, said second resistance having a greater value of resistance than said first resistance.

2. The control circuit of claim 1 and further including in said holding circuit a thermal overload device connected between said breaker contacts and said second resistance.

3. The control circuit of claim 1 and further including a signalling circuit connected across said winding comprising in series a third resistance, a second pair of switch contacts adapted to be opened momentarily upon actuation of said first pair of switch contacts and a signal lamp.

References Cited in the file of this patent
UNITED STATES PATENTS

| | | |
|---|---|---|
| 389,254 | Shephardson | Sept. 11, 1888 |
| 2,443,648 | Austin et al. | June 22, 1948 |